United States Patent
Van Horne et al.

(10) Patent No.: US 12,502,522 B1
(45) Date of Patent: Dec. 23, 2025

(54) EXPANDABLE BALLOON BASED IMPELLERS FOR BLOOD PUMPS

(71) Applicant: Narwhal Medical, Inc., Minneapolis, MN (US)

(72) Inventors: Loïc Van Horne, Minneapolis, MN (US); Peter T. Keith, St. Paul, MN (US); Peter Jacobs, St. Louis Park, MN (US)

(73) Assignee: Narwhal Medical, Inc., Minneapolis, MN (US)

( * ) Notice: Subject to any disclaimer, the term of this patent is extended or adjusted under 35 U.S.C. 154(b) by 0 days.

(21) Appl. No.: 19/213,587

(22) Filed: May 20, 2025

(51) Int. Cl.

| | |
|---|---|
| *A61M 60/178* | (2021.01) |
| *A61M 60/13* | (2021.01) |
| *A61M 60/17* | (2021.01) |
| *A61M 60/174* | (2021.01) |
| *A61M 60/216* | (2021.01) |
| *A61M 60/237* | (2021.01) |
| *A61M 60/403* | (2021.01) |

(52) U.S. Cl.
CPC .......... *A61M 60/17* (2021.01); *A61M 60/237* (2021.01); *A61M 60/403* (2021.01)

(58) Field of Classification Search
CPC .. A61M 60/13; A61M 60/174; A61M 60/178; A61M 60/216; A61M 60/226; A61M 60/414; A61M 60/416; A61M 60/538; A61M 60/585; A61M 60/808; A61M 60/81; A61M 60/824; A61M 60/841
See application file for complete search history.

(56) References Cited

U.S. PATENT DOCUMENTS

| | | | |
|---|---|---|---|
| 10,905,808 | B2 | 2/2021 | Tuval et al. |
| 10,994,120 | B2 | 5/2021 | Tuval et al. |
| 11,839,753 | B2 | 12/2023 | Van Horne |
| 11,896,813 | B2 | 2/2024 | Horne |
| 2003/0135086 | A1 | 7/2003 | Khaw et al. |
| 2011/0071338 | A1 | 3/2011 | McBride et al. |
| 2011/0257462 | A1 | 10/2011 | Rodefeld et al. |
| 2013/0066140 | A1 | 3/2013 | McBride et al. |
| 2013/0303831 | A1 | 11/2013 | Evans |
| 2014/0275726 | A1 | 9/2014 | Zeng |
| 2016/0101224 | A1 | 4/2016 | Akkerman et al. |
| 2020/0237982 | A1 | 7/2020 | Tuval et al. |
| 2021/0170081 | A1 | 6/2021 | Kanz |
| 2023/0137473 | A1 | 5/2023 | Zipory et al. |
| 2023/0256229 | A1 | 8/2023 | Horne |
| 2023/0256230 | A1 | 8/2023 | Horne |
| 2023/0256231 | A1 | 8/2023 | Horne |
| 2024/0042191 | A1 | 2/2024 | Horne |
| 2024/0374888 | A1 * | 11/2024 | Horne ................. A61M 60/585 |

FOREIGN PATENT DOCUMENTS

| | | | |
|---|---|---|---|
| WO | WO 2000/019097 A1 | 4/2000 | |
| WO | WO 2003/103745 A2 | 12/2003 | |

* cited by examiner

*Primary Examiner* — Jon Eric C Morales
(74) *Attorney, Agent, or Firm* — Fish & Richardson P.C.

(57) ABSTRACT

Some pump impellers used in mechanical circulatory support systems such as percutaneous ventricular assist devices can be expandable. Some such impellers can be inflatable, for example. Some inflatable impellers can have an inflatable main body and a plurality of inflatable fins extending along the main body in a linear or a spiral arrangement. In some cases, such fins can be non-inflatable. Such fins can also be coupled to each other in an arrangement of two or more fin members in a stacked configuration.

19 Claims, 13 Drawing Sheets

EXPANDABLE BALLOON BASED IMPELLERS FOR BLOOD PUMPS

TECHNICAL FIELD

The present disclosure relates to impellers used in mechanical circulatory support systems, devices, and methods, such as expandable percutaneous ventricular assist devices and usage methods.

BACKGROUND

Mechanical circulatory support devices, such as percutaneous ventricular assist devices ("pVADs") and other devices, are currently used in interventional cardiology to off load the work a patient's heart has to perform by assisting in the function of pumping blood. If a complication occurs during a percutaneous coronary intervention (PCI), having hemodynamic support to continue circulating blood throughout the body while the complication is mitigated provides significant patient benefits.

Current pVADs require a relatively large access site to accommodate delivery. Large access site requirements require vascular access via large vessels such as the femoral artery, the axillary artery, or in the venous system. Large access sites require longer patient follow-up and are more prone to bleeding complications than smaller access sites.

Additionally, the sizes of current pVADs are too large for many patients throughout the world including children and people with smaller body structures or smaller peripheral vasculature. Accordingly, improved systems, devices, and methods will lead to improved patient care.

SUMMARY

This disclosure describes blood pump systems such as pVADs, and methods for their deployment and use. This disclosure describes a number of expandable impellers used for the blood pump systems.

In one aspect, this disclosure is directed to an expandable pump impeller that includes an inflatable main body and a plurality of fins attached to an outer surface of the main body. Each fin includes a non-inflatable membrane and one or more inflatable portions attached to the non-inflatable membrane.

Such an expandable pump impeller may optionally include one or more of the following features. The one or more inflatable portions may include an inflatable spine attached at an outer edge of the non-inflatable membrane. The expandable inflatable spine may be attached at less than an entirety of the outer edge of the non-inflatable membrane. The inflatable spine may be attached at a proximal portion of the outer edge of the non-inflatable membrane while a distal portion of the outer edge of the non-inflatable membrane is free of the inflatable spine. The inflatable spine may be attached at a distal portion of the outer edge of the non-inflatable membrane while a proximal portion of the outer edge of the non-inflatable membrane is free of the inflatable spine. In some embodiments, a diameter of the inflatable spine is larger at a proximal end of the inflatable spine than at a distal end of the inflatable spine. In particular embodiments, a diameter of the inflatable spine is larger at a distal end of the inflatable spine than at a proximal end of the inflatable spine. In some examples, each fin extends along the outer surface of the main body linearly. In certain embodiments, each fin extends along the outer surface of the main body spirally. A pitch of each fin may vary along a length of the fin. The one or more inflatable portions may include an inflatable batten extending from the main body and along the non-inflatable membrane. In some embodiments, the one or more inflatable portions comprise at least two inflatable battens that are separated from each other and extending from the main body along the non-inflatable membrane. The one or more inflatable portions may include an inflatable spine attached at an outer edge of the non-inflatable membrane, and an inflatable batten extending from the main body and along the non-inflatable membrane.

In another aspect, this disclosure is directed to expandable pump impeller including an inflatable main body and a plurality of fins attached to an outer surface of the main body. Each fin can include an inflatable tube defining a lumen that is fluidly connected to an open internal space of the main body.

Such an expandable pump impeller may optionally include one or more of the following features. Each fin may extend along the outer surface of the main body linearly. Each fin may extend along the outer surface of the main body spirally. In some embodiments, each fin comprises a second inflatable tube stacked on the inflatable tube. The expandable pump impeller may also include an inflatable main body, and a plurality of fins attached to an outer surface of the main body, wherein each fin comprises a solid ridge. In some embodiments, each fin includes a second solid ridge stacked on the solid ridge. In particular embodiments, each fin extends along the outer surface of the main body linearly or extends along the outer surface of the main body spirally.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Mechanical hemodynamic support devices, such as percutaneous ventricular assist devices ("pVADs") according to embodiments of the present disclosure, are capable of unloading or assisting the heart of a patient for a period of time during, for example, a myocardial infarction, cardiogenic shock, a surgical or interventional procedure, and the like.

In some embodiments, the pVAD devices described herein have a sufficiently small profile to facilitate deployment through a radial artery access site. Some such embodiments of the pVAD devices described herein have an innovative two-part design that allows very small delivery profiles as required by the radial artery access site, for example. The pVAD devices described herein can also be deployed via other vascular access sites such as, but not limited to, the femoral artery, the axillary artery, and the venous system, to provide a few non-limiting examples.

After the device has been advanced to a desired location, or a target location, for example within the heart of a patient, it is radially expanded from its entry profile, also referred to as a low-profile or collapsed configuration, to its functional pumping size, also referred to as an expanded or operable configuration. Devices according to embodiments of the present disclosure can be configured to provide various flow outputs.

As used herein, the terms "proximal" and "distal" pertain to the orientation of the impeller, not the patient. More specifically, with relation to the impeller, the distal side of the impeller refers to the side of the impeller which is facing the flow ingress into the pump and the proximal side refers to the opposing, outflow end of the impeller.

In the figures, the term ridges and fins can be used interchangeably to define protrusions off the smooth outer surface of the impeller. These ridges, fins, or protrusions are present to alter the fluid dynamic performance of the disclosed impeller devices and to provide or enhance the fluid pumping characteristics of the impellers.

With general reference to the inflatable impellers described herein, when an impeller is in its collapsed profile, all the inflatable portions of the impeller are deflated, thus reducing the internal volume of the impeller and allowing it to collapse down and fold up to a small delivery profile. To expand the impeller, an inflation medium, which may be a liquid or a gas, or any medium which is capable of filling the internal volume of the impeller, is delivered into the impeller causing the internal volumes of the impeller to pressurize. As the impeller pressurizes it expands. Once fully expanded and pressurized, the impeller functions as a rigid body and can rotate along the central axis of the impeller to pump fluid (e.g., blood).

Figure 1:
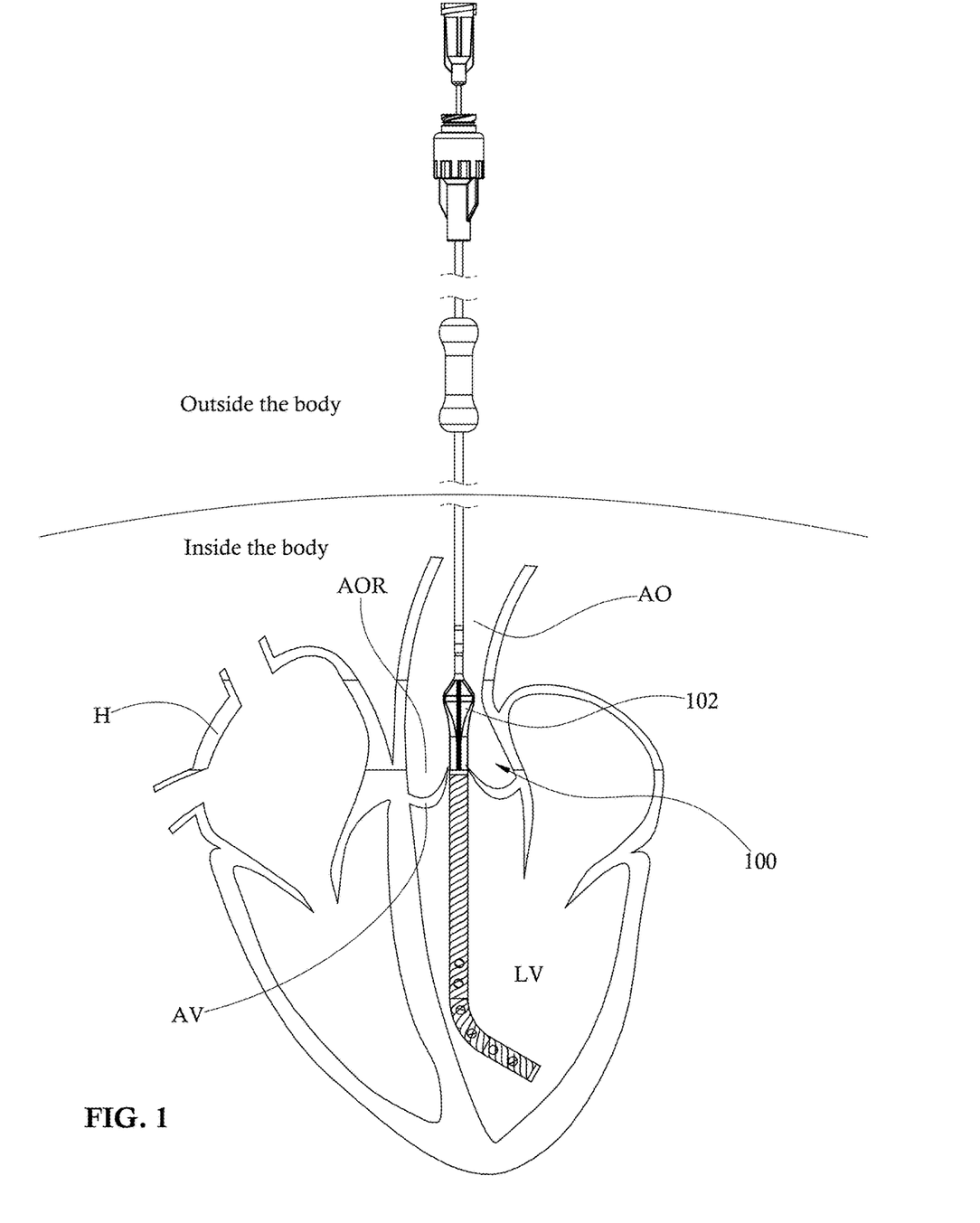
FIG. 1 illustrates an example mechanical hemodynamic support device positioned in the heart of a patient to pump blood from the left ventricle into the aorta, in accordance with embodiments of the subject matter disclosed herein.

FIG. 1 illustrates an example mechanical hemodynamic support device 100 (or "pump device 100") positioned in the heart H of a patient, in accordance with some embodiments of the subject matter disclosed herein.

In the illustrated arrangement, the pump device 100 reaches the heart H by percutaneously advancing it via a vascular access site and through the vasculature of the patient while a housing component of the pump device 100 is maintained in a low-profile delivery configuration, as described further below. In the depicted example, once the device is in the desired anatomical location, the pump is expanded to its operating size (which is the illustrated configuration).

In the depicted embodiment, the distal tip portion of the pump device 100 is located in the left ventricle (LV). The impeller 102 is located in the aortic root. The pump device 100 draws blood out of the ventricle LV and then delivers the blood at a higher pressure to the aortic root AOR via one or more blood outlets of the pump device 100 positioned in the aortic root AOR. The blood is then circulated throughout the body of the patient by the vasculature of the patient. The pumping devices described herein may also be configured to be placed in any other anatomical locations where circulatory support may be needed. Non-limiting examples may include placing the pump in the right ventricle, in the descending aorta near the renal arteries, in the carotid arteries, or at the iliac arch, and the like.

Figure 2A:
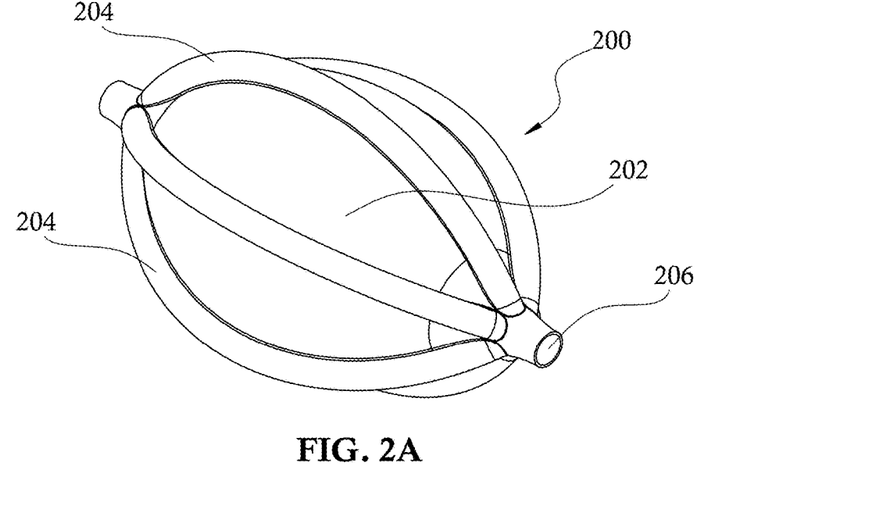
FIGS. 2A-2C illustrate an example inflatable impeller with ridges with proprietary lumens, in accordance with embodiments of the subject matter disclosed herein.
Figure 2B:
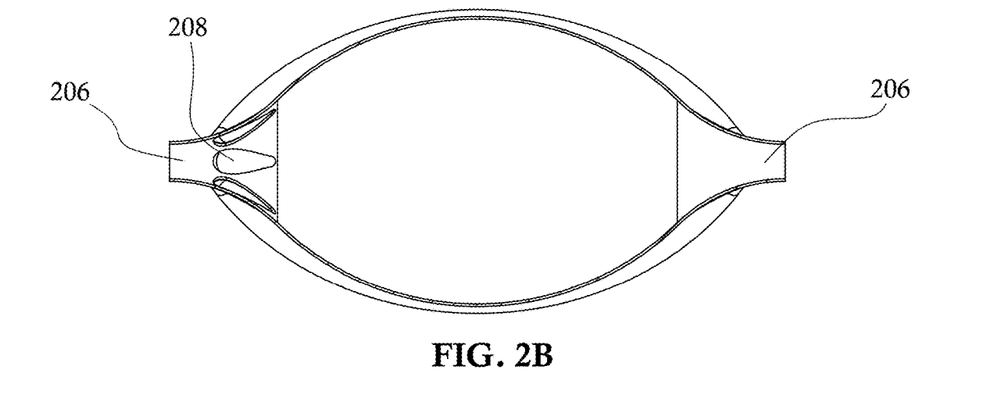
Figure 2C:
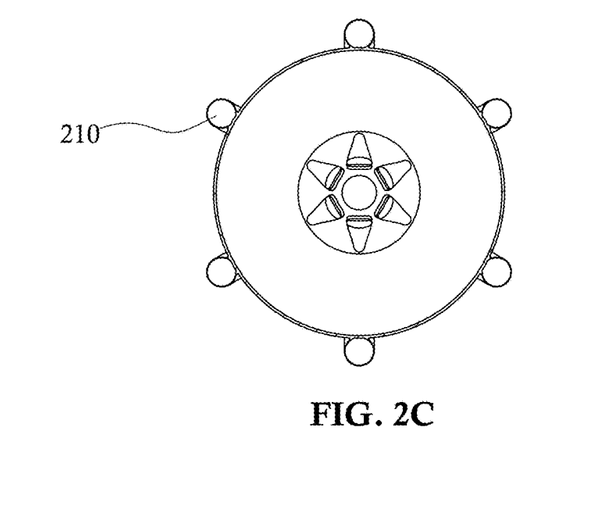

FIGS. 2A-2C illustrate an inflatable impeller 200 with a main body 202 which has an oblong or ovoid shape. Inflatable ridges 204 are attached along the outer surface of the main body 202. The ridges 204 are attached in an axially aligned orientation to the central rotation axis of the impeller 200. The distal and proximal ends of the impeller have impeller luminal openings 206 that are open to the internal space defined by the main body 202.

FIG. 2B illustrates an axial cross-sectional view of impeller 200. In this view, the lumen of the inflatable ridges 204 are connected to the main body 202 through the luminal interfaces 208. These luminal interfaces are depicted as only being present on a single side (proximal or distal) of the impeller 200, but they may alternatively be simultaneously present on both the proximal and distal sides of the impeller 200.

FIG. 2C illustrates a radial cross-sectional view of impeller 200. In this view, the internal lumen 210 of each of the six ridges 204 can be seen to be open or hollow. While six ridges are illustrated, it is understood that the number of ridges may be different. In this non-limiting embodiment, the cross-sectional shapes of the ridges 204 are circular. In some embodiments, the cross-sectional shapes of the ridges 204 (and other ridges/fins described herein) are oblong, triangular, rectangular, or other shapes.

Figure 3A:
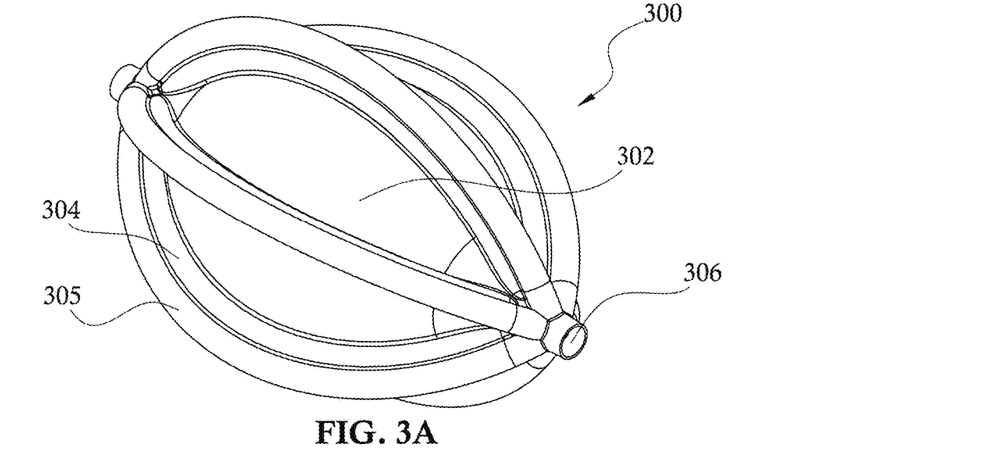
FIGS. 3A-3C illustrate another example inflatable impeller with ridges comprising stacked structures with proprietary lumens, in accordance with embodiments of the subject matter disclosed herein.
Figure 3B:
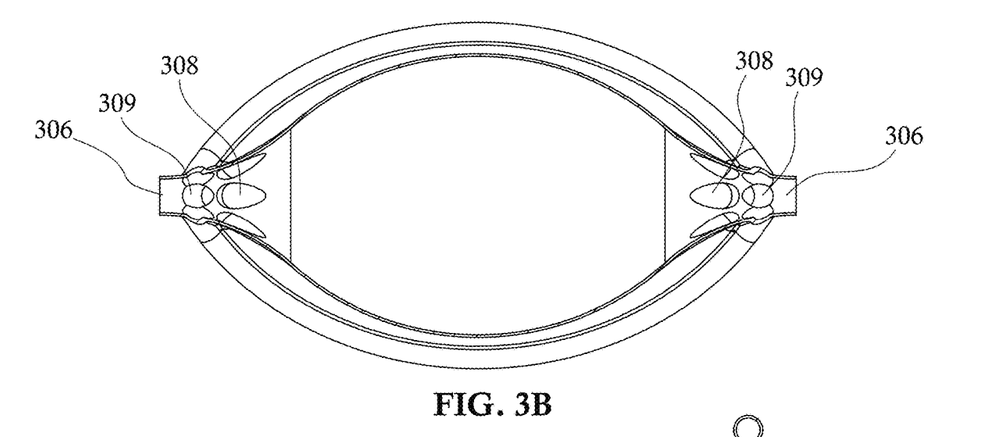
Figure 3C:
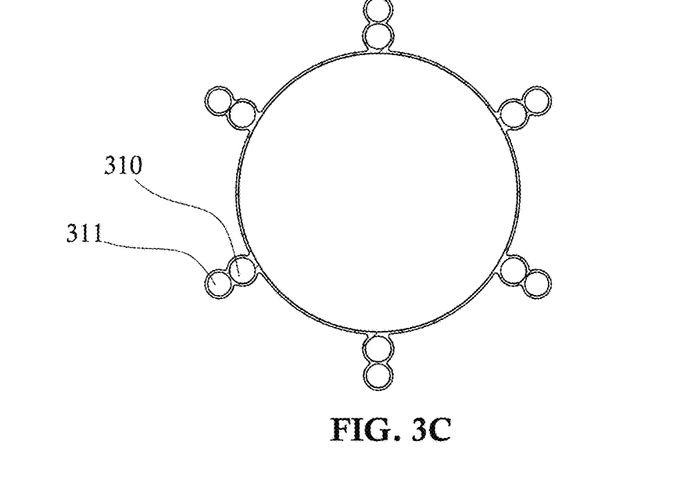

FIGS. 3A-3C illustrate an inflatable impeller 300 with a main body 302 which has an oblong or ovoid shape. Inflatable ridges 304 are attached along the outer surface of the main body 302. Additional inflatable ridges 305 are stacked on top of ridges 304. While only double high stacks of inflatable ridges are depicted, it is understood that these ridges may be comprised of multiple additional stacked tubular ridges. The ridges 304 and 305 are attached in an axially aligned orientation to the central rotation axis of the impeller 300. The distal and proximal ends of the impeller 300 have impeller luminal openings 306 that are open to the internal space defined by the main body 302.

FIG. 3B illustrates an axial cross-sectional view of impeller 300. In this view, the lumens of the inflatable ridges 304 and 305 are fluidly connected to the internal space of the main body 302 by openings or luminal interfaces 308 and 309. These luminal interfaces 308 and 309 are depicted as being present on both sides of the ridges (proximal and distal), though they may alternatively be present a single side of the impeller 300.

FIG. 3C illustrates a radial cross-sectional view of impeller 300. In this view, the internal lumens 310 and 311 of the ridges 304 and 305 respectively can be seen to be open or hollow. Also, it can be seen that, in the depicted embodiment, the internal lumens 310 and 311 of the ridges 304 and 305 are separated from each other as individual lumens 310 and 311. However, in some embodiments the internal lumens 310 and 311 of the ridges 304 and 305 can be fluidly connected/open to each other at one or more locations along the ridges 304 and 305.

Figure 4A:
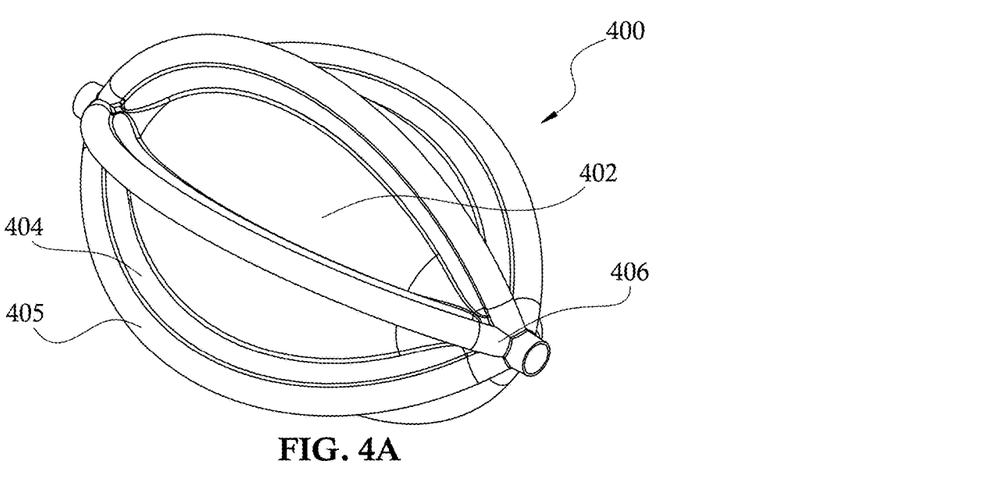
FIGS. 4A-4C illustrate another example inflatable impeller with non-inflatable ridges comprising stacked structures, in accordance with embodiments of the subject matter disclosed herein.
Figure 4B:
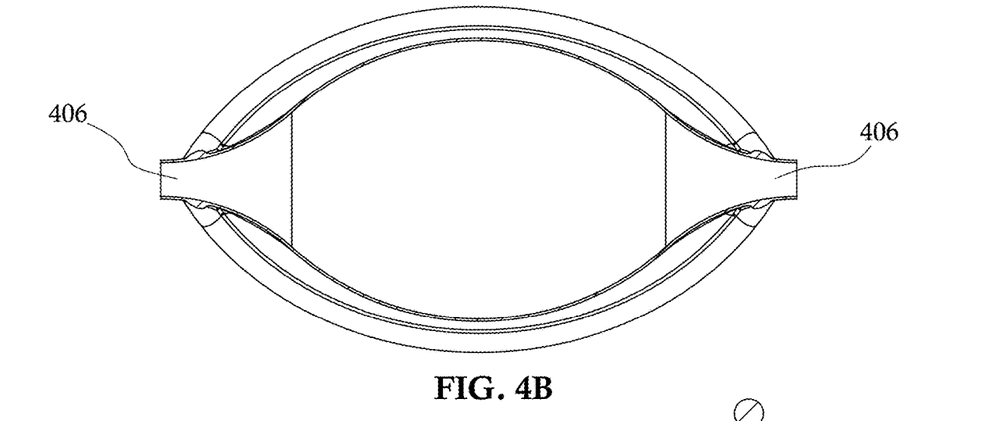
Figure 4C:
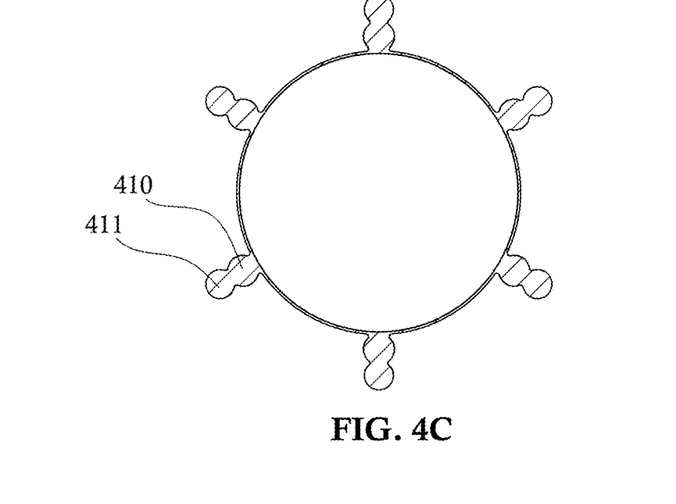

FIGS. 4A-4C illustrate an inflatable impeller 400 with a main body 402 which has an oblong or ovoid shape. Solid, non-inflatable ridges 404 are attached along the outer surface of the main body 402. Additional non-inflatable ridges 405 are stacked on top of ridges 404. While only double high stacks of ridges are depicted, it is understood that these ridges may be comprised of multiple additional stacked tubular ridges. The distal and proximal ends of the impeller 400 have impeller luminal openings 406 that are open to the internal space defined by the main body 402.

FIG. 4B illustrates an axial cross-sectional view of impeller 400. In this view, the solid ridges 404 and 405 are connected to the main body 402, and there is no luminal opening or continuation between the main body 402 and the ridges 404 and 405 (because the ridges 404 and 405 do not define lumens).

FIG. 4C illustrates a radial cross-sectional view of impeller 400. In this view, the internal cross section 410 and 411 of the ridges 304 and 305 respectively can be seen to be filled in or made of a solid material.

An alternate configuration to the impeller 300 with inflatable stacked ridges, and impeller 400 with non-inflatable solid stacked ridges, is for an impeller to have stacked ridges where some of the ridges are inflatable and others are non-inflatable. For example, the impellers 300 and 400 can be combined so that, in one example embodiment, the ridges attached to the main body are solid while the ridges stacked on top of the solid ridges are inflatable.

Figure 5:
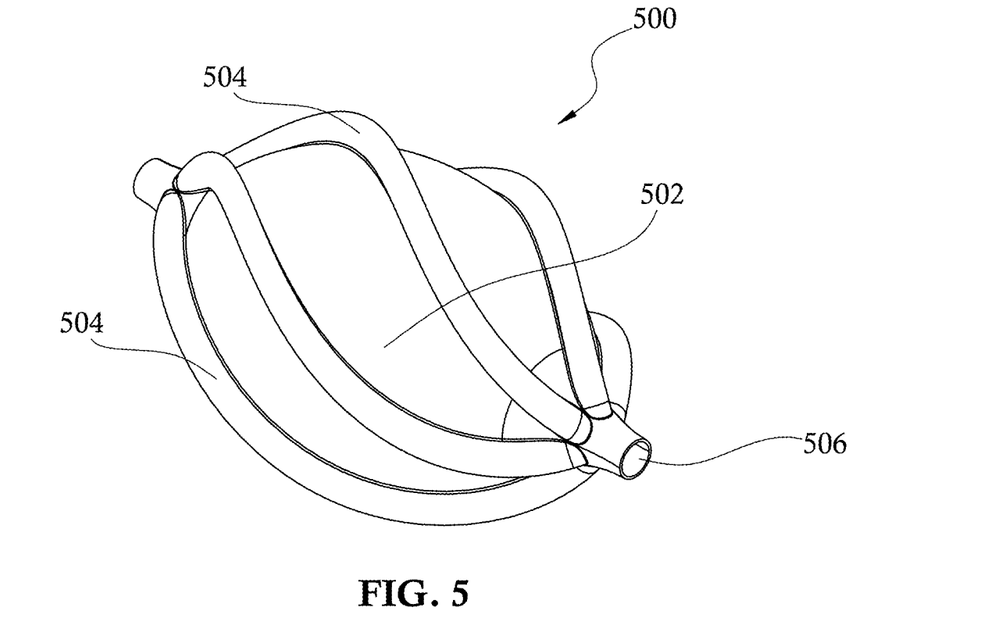
FIG. 5 illustrates another example inflatable impeller with ridges in a spiral configuration, in accordance with embodiments of the subject matter disclosed herein.

FIG. 5 illustrates an inflatable impeller 500 with inflatable or non-inflatable ridges 504 attached along the outer surface the main body 502 in a spiral configuration.

Figure 6:
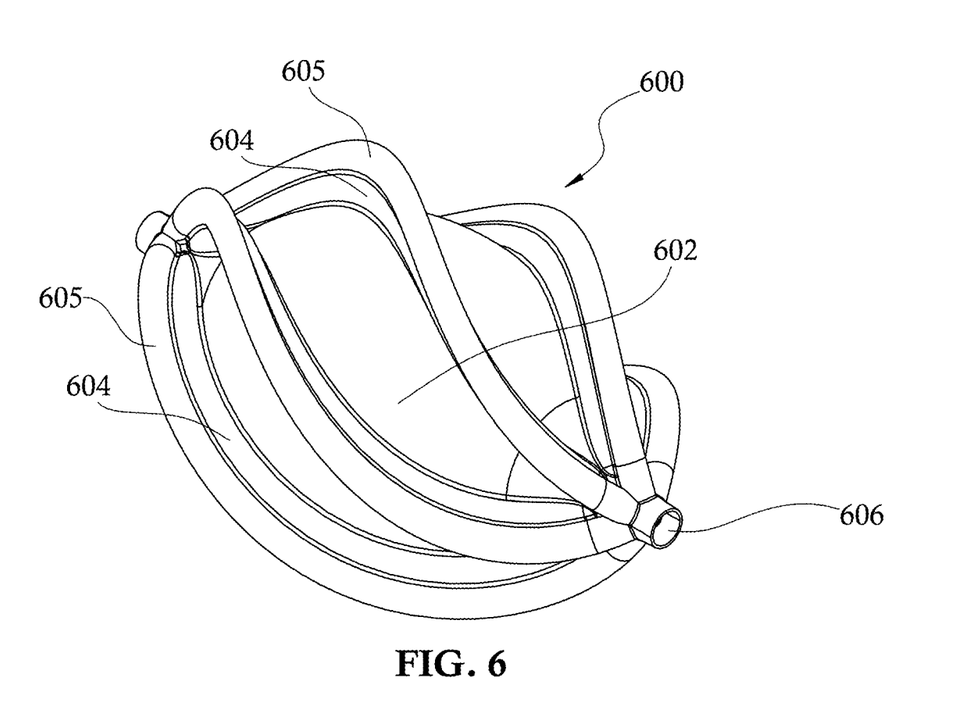
FIG. 6 illustrates another example inflatable impeller with stacked ridges in a spiral configuration, in accordance with embodiments of the subject matter disclosed herein.

FIG. 6 illustrates an inflatable impeller 600 with inflatable or non-inflatable ridges 604 and inflatable or non-inflatable stacked ridges 605 that are attached in pairs along the outer surface the main body 602 in a spiral configuration.

Figure 7:
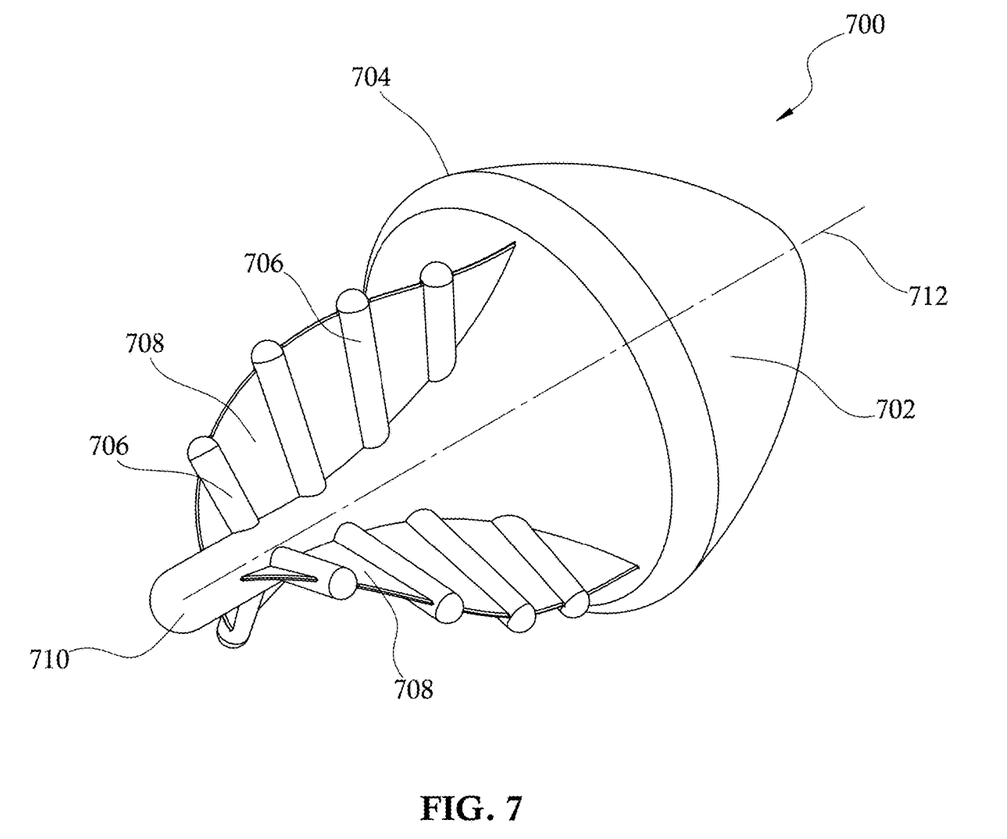
FIG. 7 illustrates another example inflatable impeller with inflatable battens, in accordance with embodiments of the subject matter disclosed herein.

FIG. 7 illustrates an impeller 700 with fins which have both inflatable battens 706 that extend radially from the central axis 712 and non-inflatable membranes 708 that extend spirally along the central axis 712. The impeller fins have a variable spiral wrap pattern around the central axis 712 of the impeller 700. Impeller 700 has an inflatable main body 702 with a maximum diameter 704. The distal tip 710 of impeller 700 is located distally of the fins. The impeller 700 rotates around the central axis 712 to pump fluid. When the impeller 700 is pressurized, the inflatable battens 706 act as supports to stiffen the non-inflatable membranes 708 which span the gap between the battens 706. This leads to the impeller fins behaving rigidly when the impeller 700 is rotating and resisting deformation from hydrodynamic forces, induced by the fluid being pumped, against the fins.

Figure 8:
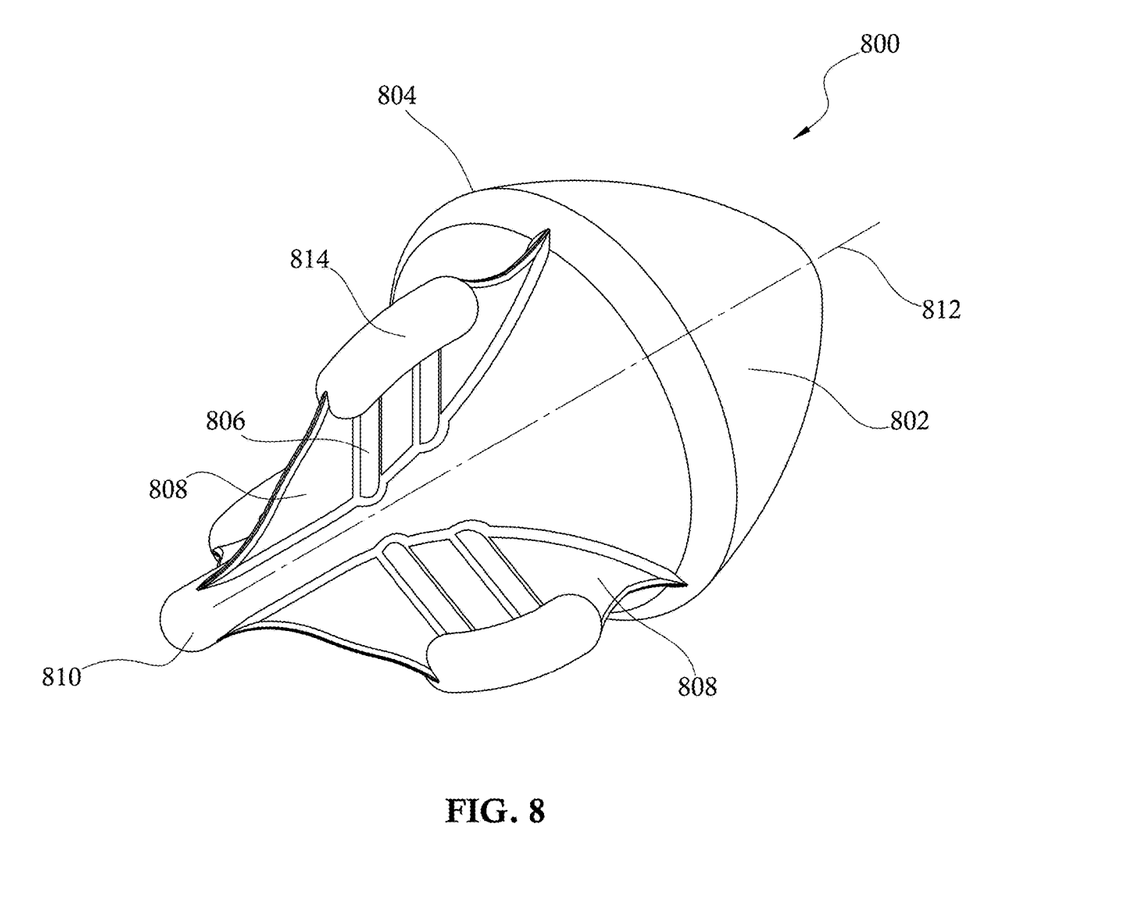
FIG. 8 illustrates another example inflatable impeller with inflatable battens and a partially inflatable fin spine, in accordance with embodiments of the subject matter disclosed herein.

FIG. 8 illustrates an impeller 800 with fins which have inflatable battens 806, non-inflatable membranes 808, and an inflatable spine 814 along a portion of the spine or outer edge of the impeller fins. In the depicted embodiment, the impeller fins are axially aligned along the central axis 812 of the impeller 800 without any spiral orientation. Alternatively, in some embodiments the impeller fins are spirally arranged along the central axis 812. When the impeller 800 is pressurized, the inflatable battens 806 along with the inflatable spine 814 act as supports to the non-inflatable membranes 808 which span the gap between the battens 806 and the inflatable spine 814. This leads to the impeller fins behaving rigidly when the impeller 800 is rotating and resisting deformation from hydrodynamic forces, induced by the fluid being pumped, against the fins.

Figure 9:
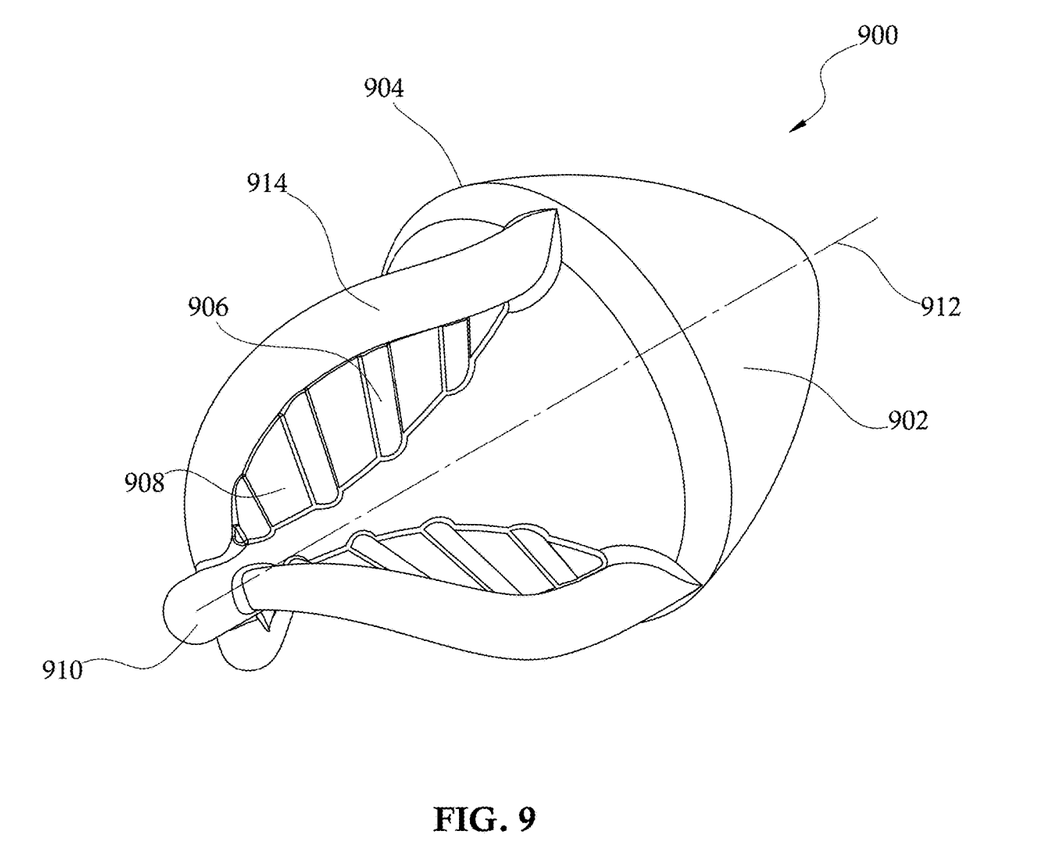
FIG. 9 illustrates another example inflatable impeller with inflatable battens and a fully inflatable fin spine, in accordance with embodiments of the subject matter disclosed herein.

FIG. 9 illustrates an impeller 900 with fins which have inflatable battens 906, non-inflatable membranes 908, and an inflatable spine 914 along the full length of the impeller fins. The impeller fins have a variable spiral wrap pattern around the central axis 912 of the impeller 900. When the impeller 900 is inflated/pressurized, the inflatable battens 906 along with the inflatable fin spine 914 act as supports to the non-inflatable membranes 908 which span the gap between the battens 906 and the inflatable spine 914. This leads to the impeller fins behaving rigidly when the impeller 900 is rotating and resisting deformation from hydrodynamic forces, induced by the fluid being pumped, against the fins.

Figure 10:
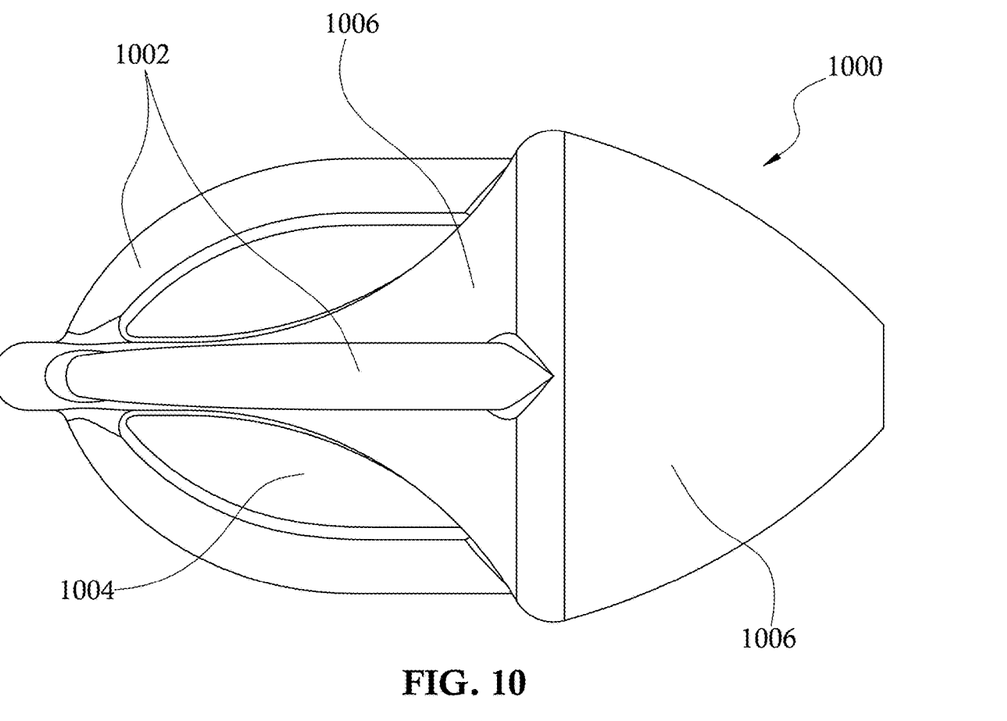
FIG. 10 illustrates another example inflatable impeller with inflatable spines, in accordance with embodiments of the subject matter disclosed herein.

FIG. 10 illustrates an impeller 1000 that has fins comprising inflatable spines 1002 and non-inflatable membranes 1004 that span the area defined between the inflatable main body 1006 of the impeller 1000 and the inflatable spines 1002. The impeller fins (the membranes 1004 and spines 1002) are axially aligned along the central axis of the impeller 1000 without any spiral orientation. When the impeller 1000 is pressurized, the inflatable spines 1002 act as a support to the non-inflatable membranes 1004. This leads to the impeller fins behaving rigidly when the impeller 1000 is rotating and resisting deformation from hydrodynamic forces, induced by the fluid being pumped, against the fins.

Figure 11:
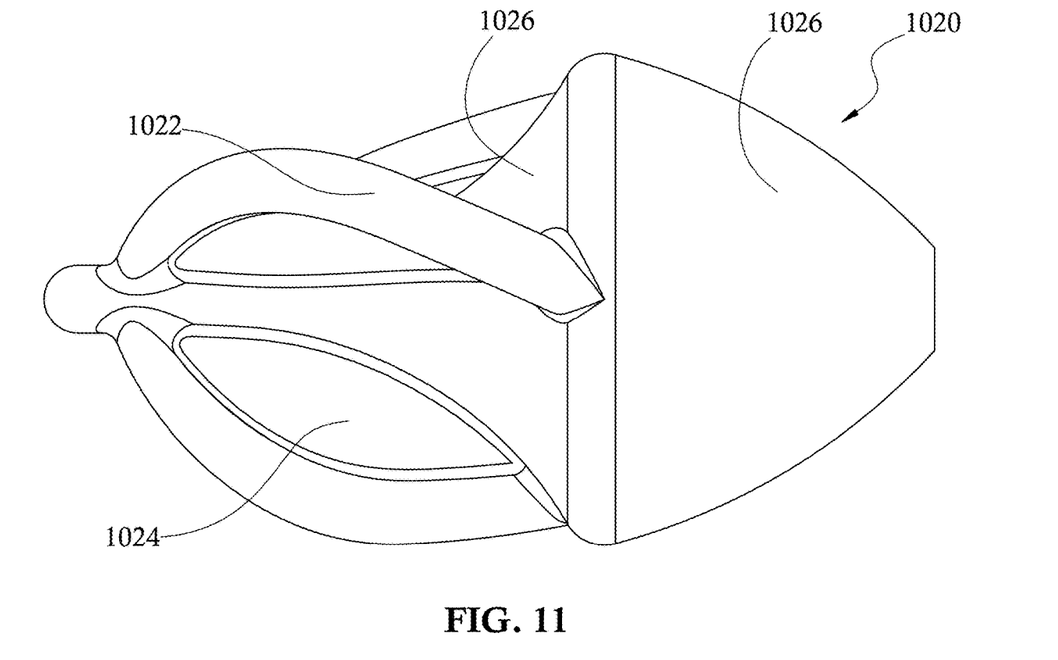
FIG. 11 illustrates another example inflatable impeller with inflatable spines, in accordance with embodiments of the subject matter disclosed herein.

FIG. 11 illustrates an impeller 1020 that has fins comprising inflatable spines 1022 and non-inflatable membranes 1024 that span the area defined between the inflatable main body 1026 of the impeller 1020 and the inflatable spines 1022. The impeller fins (the membranes 1024 and spines 1022) are spirally aligned to wrap around the central axis of the impeller 1020 with a constant pitch.

Figure 12A:
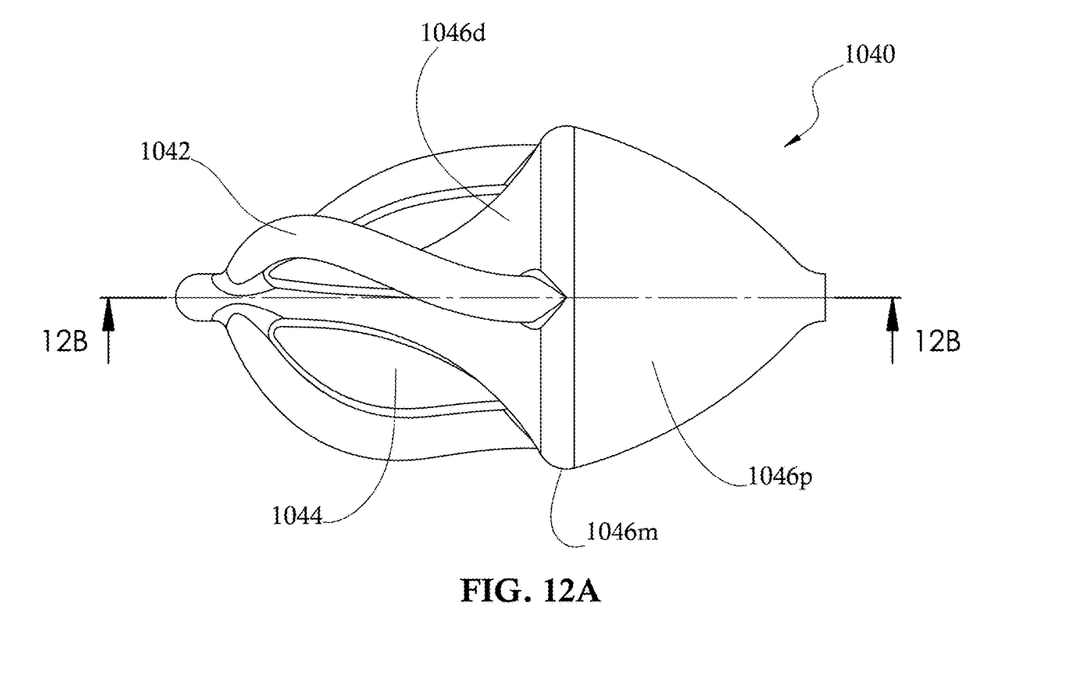
FIG. 12A illustrates another example inflatable impeller with inflatable spines, in accordance with embodiments of the subject matter disclosed herein.

FIG. 12A illustrates an impeller 1040 with fins comprising inflatable spines 1042 and non-inflatable membranes 1044. The impeller 1040 has an inflatable proximal main body 1046p and an inflatable distal main body 1046d. The fins (inflatable spines 1042 and non-inflatable membranes 1044) span the area defined between the inflatable distal main body 1046d of the impeller 1040 and the inflatable spines 1042.

In the depicted embodiment, the impeller fins (the membranes 1044 and spines 1042) are spirally aligned to wrap around the central axis of the impeller 1040 with a non-constant (variable) pitch. In this example, the distal portion of the spines 1042 have a larger spiral angle and the proximal portion of the spines 1042 have a smaller spiral angle. In other words, the proximal portion of the spines 1042 are more closely axially aligned to the central axis of the impeller 1040. Alternatively, the non-constant spiral pitch may be different with the fin's distal ends having less spiral and the proximal ends having a larger spiral, or any other combination of variable pitches.

Figure 12B:
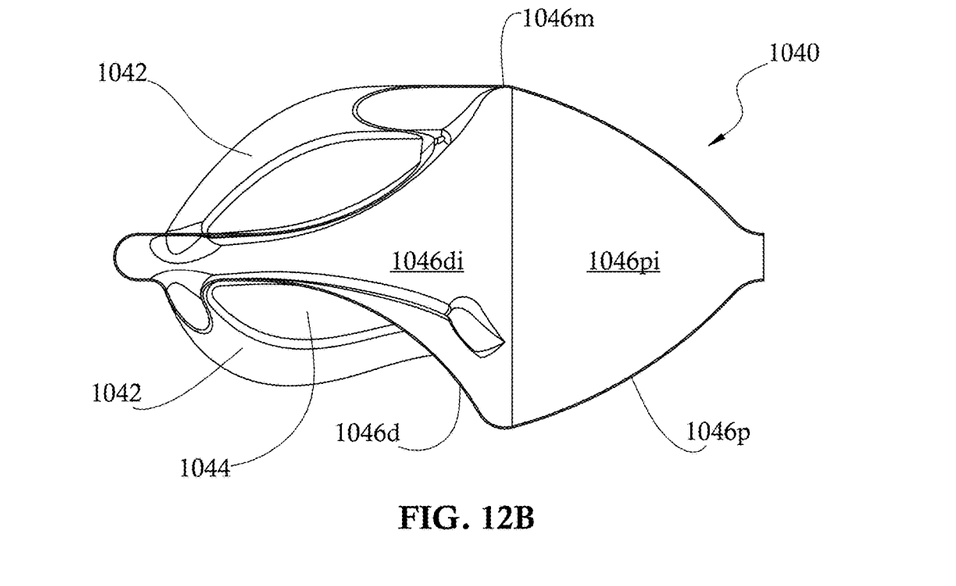
FIG. 12B is a longitudinal cross-sectional view of the impeller of FIG. 12A.

FIG. 12B is a longitudinal cross-sectional view of the impeller 1040 taken along the cut plane 12B-12B (shown in FIG. 12A). The inflatable proximal main body 1046p defines an internal space 1046pi, and the inflatable distal main body 1046d defines an internal space 1046di. The internal spaces 1046pi and 1046di configure the main body of the impeller 1040 to be expandable when an inflation fluid is supplied to the impeller 1040. That is, the impeller 1040 is configurable in a low-profile delivery configuration when uninflated, and configurable in an expanded operable configuration when inflated.

In the depicted embodiment, the outer profile of the inflatable proximal main body 1046p and the shape of the internal space 1046pi are generally conical (with a curvilinear or convex outer boundary). The smaller end of the generally conical shape is proximal of the larger end of the generally conical shape.

The outer profile of the inflatable distal main body 1046d and the shape of the internal space 1046di are also generally conical (with a curvilinear or concave outer boundary). The smaller end of the generally conical shape is distal of the larger end of the generally conical shape.

The proximal main body 1046p and the inflatable distal main body 1046d join each other at mid-body region 1046m where the diameter of the impeller 1040 is at its maximum.

In addition to the expandable/inflatable main body of the impeller 1040, the fins have the expandable/inflatable spines 1042. Like the main body, the inflatable spines 1042 are also expandable when an inflation medium is supplied to the impeller 1040. As best seen in FIG. 12B, the inflatable spines 1042 each define a lumen that is open to the internal space 1046di on both the proximal and distal ends of the inflatable spines 1042. Accordingly, inflation fluid supplied to the main body of the impeller 1040 can flow into the lumens of the inflatable spines 1042 to expand them.

The outer diameter defined by the proximal ends of inflatable spines 1042 is equal to, or substantially equal to (e.g., +/−10%, or +/−5%), the diameter of the mid-body region 1046m where the diameter of the impeller 1040 is at its maximum. In the depicted embodiment (as best seen in FIG. 12B), the maximum outer diameter defined by the proximal ends of inflatable spines 1042 extends distally from the proximal ends of the inflatable spines 1042 for at least 10%, or at least 20%, or at least 30% of the lengths of the inflatable spines 1042. Alternatively, the impeller spines 1042 may begin to taper immediately distally of the maximum outer diameter.

Figure 13:
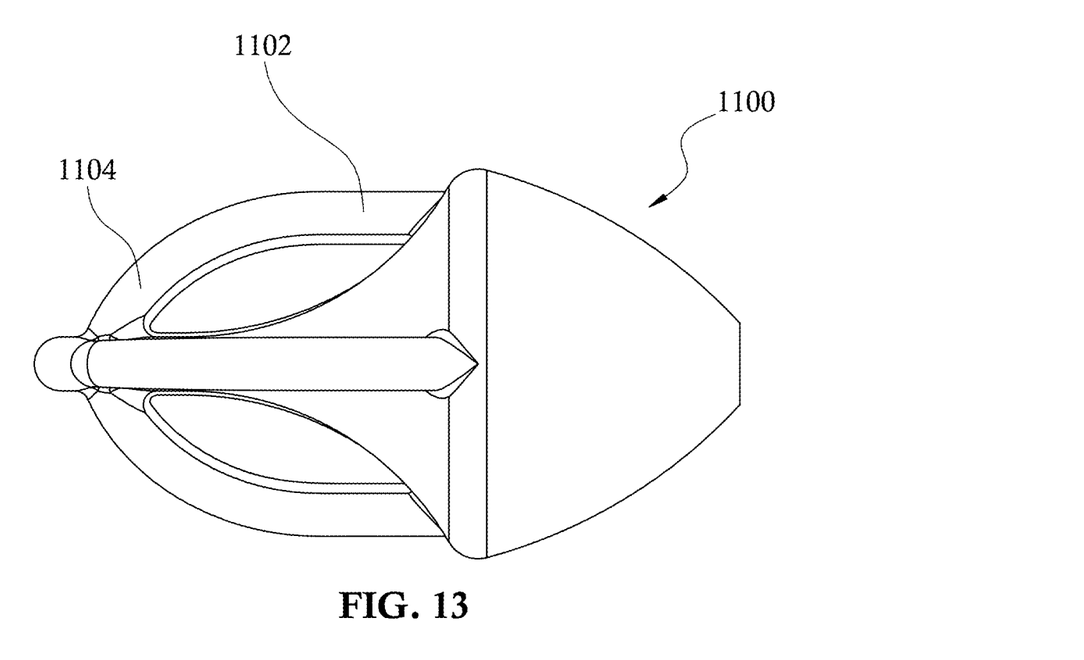
FIG. 13 illustrates another example inflatable impeller with inflatable spines, in accordance with embodiments of the subject matter disclosed herein.

FIG. 13 illustrates an impeller 1100 with fins which have inflatable spines. The inflatable spines have a consistent diameter across the whole spine from the proximal region of the spine 1102 to the distal region of the spine 1104.

Figure 14:
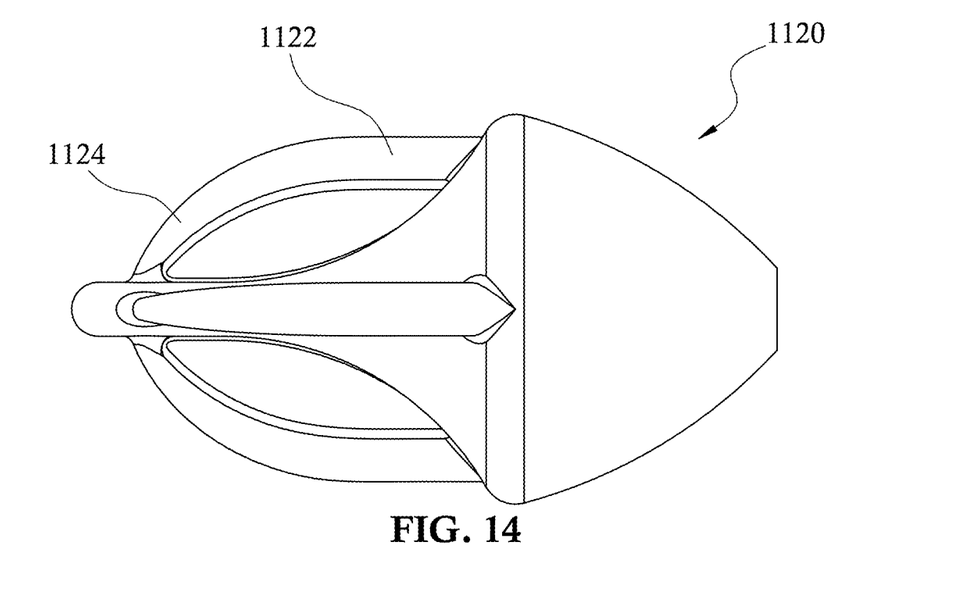
FIG. 14 illustrates another example inflatable impeller with inflatable spines, in accordance with embodiments of the subject matter disclosed herein.

FIG. 14 illustrates an impeller 1120 with fins which have inflatable spines. The inflatable spines have a variable diameter which tapers down from the proximal region of the spine 1122 to the distal region of the spine 1124. While impeller 1120 illustrates the inflatable spines tapering down in diameter towards the distal end, inflatable spines may vary in diameter in alternate ways. A few non-limiting examples are that the inflatable spines may taper down in diameter at the proximal end, they may have a constriction in the middle, or they may taper down on both ends and have the largest diameter in the middle. The support force of the inflatable spines is related to the inflation pressure used to inflate the spine along with the cross-sectional diameter of the inflatable spine. Therefore, the rigidity of the fins can be altered by changing the dimensions of the inflatable spine. Additionally, changing the shapes of the spines can change the fluid dynamic performance of the impeller 1120.

Figure 15:
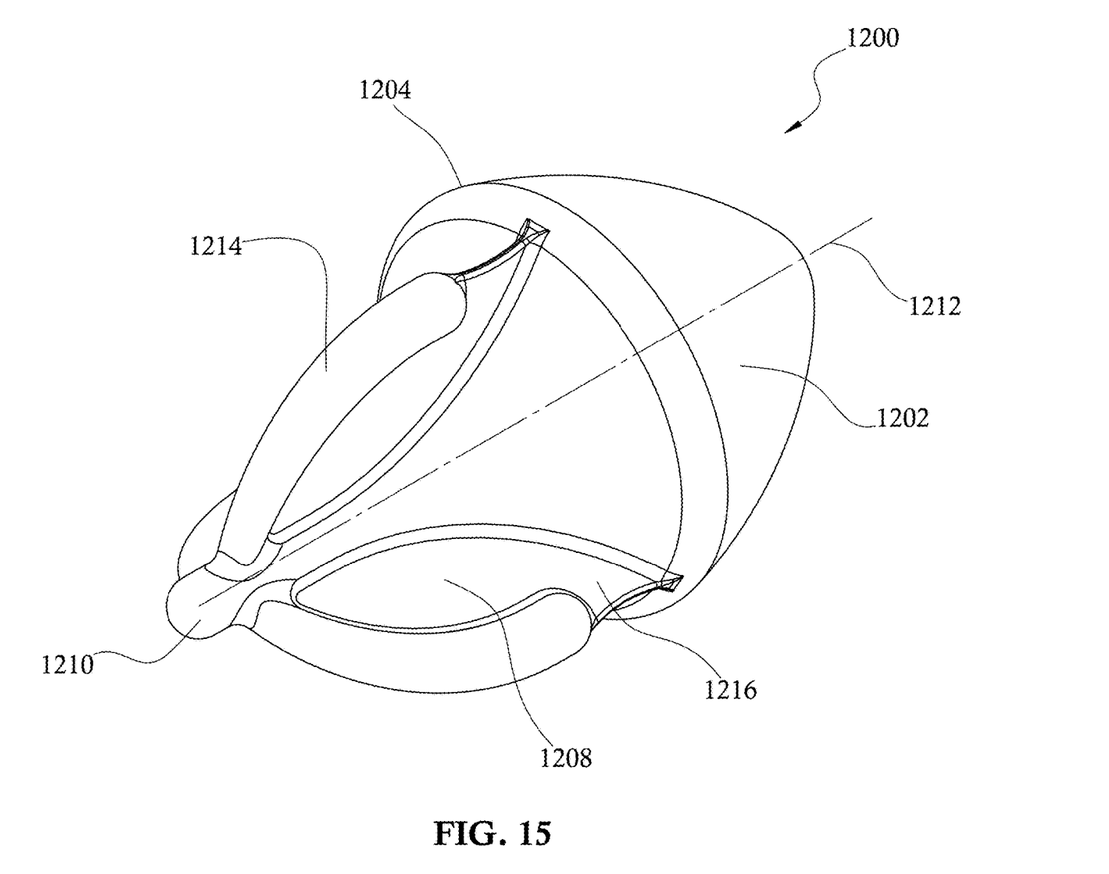
FIG. 15 illustrates another example inflatable impeller with a partially inflatable spine on the distal end portions of the fins, in accordance with embodiments of the subject matter disclosed herein.

FIG. 15 illustrates an impeller 1200 with fins which have inflatable spines 1214 and non-inflatable membranes 1208 spanning the gap between the main body of the impeller 1200 and the spines 1214. The inflatable spines 1214 of the impeller 1200 are located on the distal portion of the fins, leaving a proximal portion of the fin spine 1216 non-inflatable. Having a non-inflatable proximal portion 1216 of the fin alters the flow dynamics of the fluid at this region of the impeller 1200, allowing the fluid in contact with the non-inflatable membranes 1208 to more seamlessly flow off of the impeller 1200.

Figure 16:
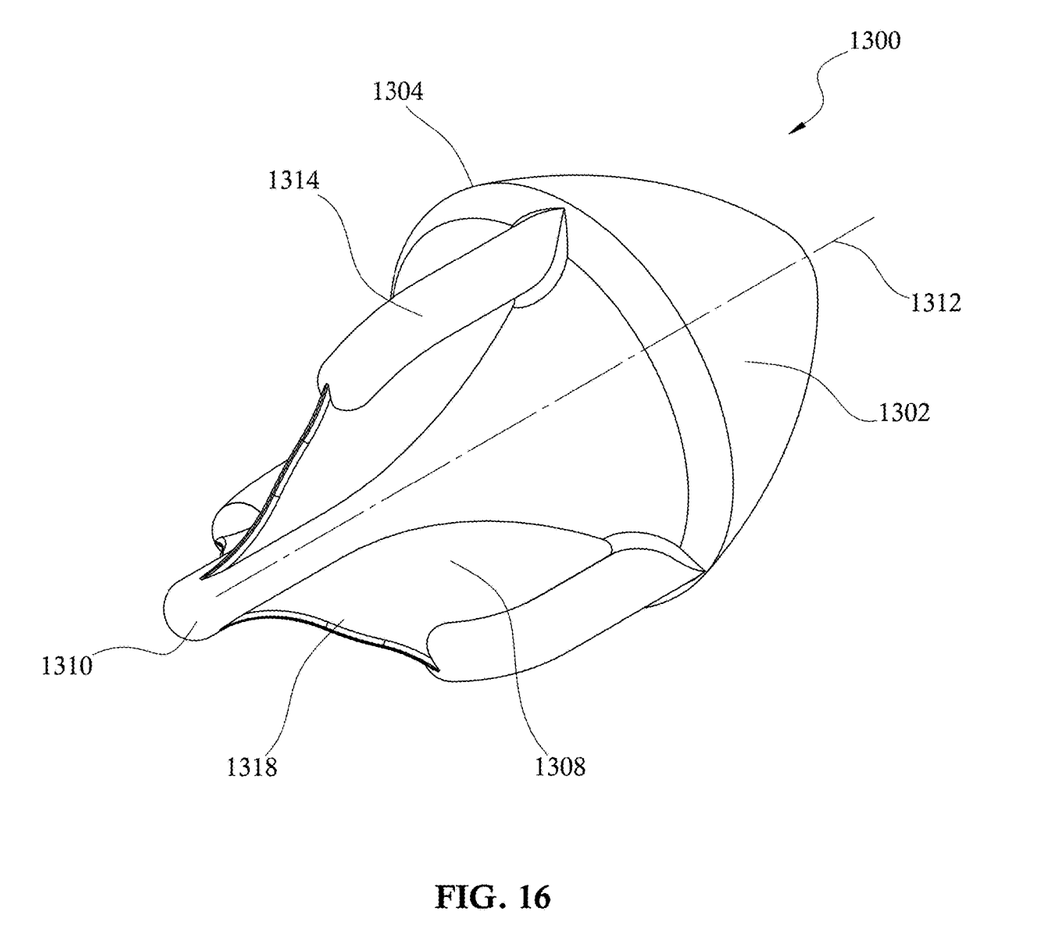
FIG. 16 illustrates another example inflatable impeller with a partially inflatable spine on the proximal end portions of the fins, in accordance with embodiments of the subject matter disclosed herein.

FIG. 16 illustrates an impeller 1300 with fins which have inflatable spines 1314 and non-inflatable membranes 1308 spanning the gap between the main body of the impeller 1300 and the spines 1314. The inflatable spines 1314 of the impeller 1300 are located on the proximal portion of the fins, leaving a distal portion of the fin spine 1318 non-inflatable. Having a non-inflatable distal portion of the fin 1318 alters the flow dynamics of the fluid at this region of the impeller 1300. Having a non-inflatable distal portion of the spine 1318 may allow for easier fluid ingress into the pumping chamber and improve the pumping performance of the impeller 1300.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

The invention claimed is:

1. An expandable pump impeller comprising:
   an inflatable main body; and
   a plurality of fins attached to an outer surface of the inflatable main body, wherein each fin comprises:
   a non-inflatable membrane; and
   one or more inflatable portions separate from the inflatable main body and attached to the non-inflatable membrane.

2. The expandable pump impeller of claim 1, wherein the one or more inflatable portions comprise an inflatable spine attached at an outer edge of the non-inflatable membrane.

3. The expandable pump impeller of claim 2, wherein the inflatable spine is attached at less than an entirety of the outer edge of the non-inflatable membrane.

4. The expandable pump impeller of claim 2, wherein the inflatable spine is attached at a proximal portion of the outer edge of the non-inflatable membrane while a distal portion of the outer edge of the non-inflatable membrane is free of the inflatable spine.

5. The expandable pump impeller of claim 2, wherein the inflatable spine is attached at a distal portion of the outer edge of the non-inflatable membrane while a proximal portion of the outer edge of the non-inflatable membrane is free of the inflatable spine.

6. The expandable pump impeller of claim 2, wherein a diameter of the inflatable spine is larger at a proximal end of the inflatable spine than at a distal end of the inflatable spine.

7. The expandable pump impeller of claim 2, wherein a diameter of the inflatable spine is larger at a distal end of the inflatable spine than at a proximal end of the inflatable spine.

8. The expandable pump impeller of claim 2, wherein each fin extends along the outer surface of the inflatable main body linearly.

9. The expandable pump impeller of claim 2, wherein each fin extends along the outer surface of the inflatable main body spirally.

10. The expandable pump impeller of claim 9, wherein a pitch of each fin varies along a length of the fin.

11. The expandable pump impeller of claim 1, wherein the one or more inflatable portions comprise an inflatable batten extending from the inflatable main body and along the non-inflatable membrane.

12. The expandable pump impeller of claim 1, wherein the one or more inflatable portions comprise at least two inflatable battens that are separated from each other and extending from the inflatable main body along the non-inflatable membrane.

13. The expandable pump impeller of claim 1, wherein the one or more inflatable portions comprise:
    an inflatable spine attached at an outer edge of the non-inflatable membrane; and
    an inflatable batten extending from the inflatable main body and along the non-inflatable membrane.

14. An expandable pump impeller comprising:
    an inflatable main body; and
    a plurality of fins attached to an outer surface of the inflatable main body, wherein each fin comprises:
    an inflatable tube defining a lumen that is separate from the inflatable main body and fluidly connected to an open internal space of the inflatable main body.

15. The expandable pump impeller of claim 14, wherein each fin extends along the outer surface of the inflatable main body linearly.

16. The expandable pump impeller of claim 14, wherein each fin extends along the outer surface of the inflatable main body spirally.

17. The expandable pump impeller of claim 14, wherein each fin comprises a second inflatable tube stacked on the inflatable tube.

18. An expandable pump impeller comprising:
    an inflatable main body; and
    a plurality of fins attached to an outer surface of the inflatable main body, wherein each fin comprises:
    a solid ridge; and
    a second solid ridge radially stacked on top of the solid ridge.

19. The expandable pump impeller of claim 18, wherein each fin extends along the outer surface of the inflatable main body linearly or extends along the outer surface of the inflatable main body spirally.

* * * * *